United States Patent [19]

Kurasawa

[11] Patent Number: 4,833,105

[45] Date of Patent: May 23, 1989

[54] ANTI-FOGGING MATERIAL

[75] Inventor: Morio Kurasawa, Tokyo, Japan

[73] Assignee: Kurasawa Optical Industry Co., Ltd., Japan

[21] Appl. No.: 77,423

[22] Filed: Jul. 24, 1987

[30] Foreign Application Priority Data

Jul. 26, 1986 [JP] Japan .................................. 61-176366

[51] Int. Cl.$^4$ ............................................. C03C 3/247
[52] U.S. Cl. ........................................ 501/44; 501/15; 501/17; 501/19; 501/57; 501/60; 501/63
[58] Field of Search ....................... 501/57, 60, 15, 17, 501/19, 44, 63

[56] References Cited

U.S. PATENT DOCUMENTS 4,242,412  12/1980  Funaki ................................. 65/60.3

FOREIGN PATENT DOCUMENTS 2528032  12/1983  France ................................. 501/44
53-033209  3/1978  Japan ................................... 501/44
55-056177  4/1980  Japan .
59-217783  12/1984  Japan .

Primary Examiner—William R. Dixon, Jr.
Assistant Examiner—Anthony J. Green
Attorney, Agent, or Firm—Griffin, Branigan & Butler

[57] ABSTRACT

A matrix of a glass or a plastic is mixed with 1% to 10% of a niobium substance, 1% to 10% of a magnesium compound, 1% to 10% of barium fluoride, and 5% to 30% of lead, the percentages indicating the weight of these substances the matrix. The mixture is heat-molded to form an anti-fogging material.

1 Claim, No Drawings

ANTI-FOGGING MATERIAL

BACKGROUND OF THE INVENTION

1. Field of the Invention

The present invention relates to an anti-fogging material which is not fogged by water droplets adhering thereto.

2. Prior Art

Fogging of spectacle lenses made of glass or plastic occurs when water vapor in the air condenses owing to the difference between the temperatures of the air and the spectacle lenses, with the result that tiny lens-shaped water droplets adhere to the surfaces of the spectacle lenses and irregularly reflect or refract light in a complex manner. To prevent the occurrence of such fogging, it is known to coat the surfaces of the spectacle lenses with an anti-fogging liquid such as a hydrophilic activator so that the surface tension is thereby decreased and the generation of water droplets is thereby avoided. However, this technique suffers from a problem in that the coated anti-fogging liquid cannot remain effective for a long period of time because it evaporates or is wiped off.

SUMMARY OF THE INVENTION

Accordingly, an object of the present invention is to provide an anti-fogging material which does not need to be treated in any special way, such as by coating it with an anti-fogging liquid, to eliminate fogging, that is, to provide an anti-fogging material which has characteristics which ensure that it does not become fogged up when it is used in, for example, spectacle lenses.

To achieve the above-described object, a niobium substance, a magnesium compound, barium fluoride and lead are mixed into the matrix of a glass or a plastic, and the mixture is heat-molded to form an anti-fogging material.

Magnesium compounds and barium fluoride are water repellent. Lead absorbs water droplets, then repels the absorbed water quickly. Niobium substances help to make the employed substances exhibit their characteristics by accelerating the intermolecular bonding thereof, while reducing the degree of expansion and variation in temperature of the glass or plastic which is used as the matrix. With these substances mixed in the matrix, the resultant material does not allow tiny lens-shaped water droplets to be formed on the surface thereof.

DESCRIPTION OF THE PREFERRED EMBODIMENT

The present invention will now be described in detail by way of examples. Experiments were conducted to investigate how the mixing of various amounts of niobium pentoxide ($Nb_2O_5$), magnesium difluoride ($MgF_3$), barium fluoride ($BaF_2$), and lead (Pb) into the matrix of a glass affects how the resultant material becomes fogged. The Table below shows the results of experiments on 18 examples, with evaluations indicated by Δ ○ ◉. In the table, components A, B, C, and D represent niobium pentoxide, magnesium difluoride, barium fluoride, and lead, respectively. The amounts of these substances contained in the matrix are indicated by percentage of ratios of the weights of these substances to that of the matrix. A mark ◉ means that the material has an excellent anti-fogging property, ○ means its anti-fogging effect is good, and Δ denotes that the material is anti-fogging enough for practical use.

| Component | Example | | | | | | | | | | | | | | | | | |
|---|---|---|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 | 16 | 17 | 18 |
| A% | 1 | 2 | 2 | 2 | 3 | 3 | 3 | 4 | 4 | 4 | 5 | 5 | 5 | 6 | 7 | 8 | 9 | 10 |
| B% | 1 | 1 | 2 | 2 | 2 | 3 | 3 | 4 | 4 | 4 | 5 | 5 | 6 | 7 | 8 | 9 | 10 |
| C% | 1 | 1 | 1 | 2 | 2 | 2 | 3 | 3 | 4 | 4 | 4 | 5 | 6 | 7 | 8 | 9 | 10 |
| D% | 5 | 5 | 5 | 5 | 10 | 10 | 10 | 10 | 15 | 15 | 15 | 15 | 15 | 20 | 20 | 25 | 30 | 30 |
| Evaluation | Δ | Δ | ○ | ○ | ○ | ◉ | ◉ | ◉ | ◉ | ◉ | ○ | ○ | ○ | Δ | Δ | Δ | Δ | Δ |

As can be seen from the table, the material is most effective in eliminating fogging when the ratios of the niobium pentoxide, magnesium difluoride, barium trifluoride, and lead are between 1% and 10%, between 1% and 10%, between 1% and 10%, and between 5% and 30%, respectively.

The present invention is not limited to this embodiment, but various modifications are possible within the scope of the appended claims. For example, in this embodiment, a glass was used as the matrix. However, a plastic may be employed instead. Suitable niobium substances include niobium (Nb) as a simple substance, niobium compounds and niobium intermetallic compounds. Suitable magnesium compounds include magnesium oxide (MgO), magnesium hydroxide ($Mg(OH)_2$), magnesium fluoride ($MgF_2$), magnesium carbonate ($MgCO_3$), magnesium phosphate ($Mg_3(PO_4)_2$), magnesium diphosphate ($Mg_2P_2O_7$), and ammonium magnesium phosphate ($NH_4MgPO_4$).

As will be understood from the foregoing description, mixing the above-described four substances into a matrix of glass or plastic and heat molding the mixture produce an anti-fogging material in itself. Such a material need not be treated in any special way such as by coating it with an anti-fogging liquid. Further, its anti-fogging effect is permanent. Therefore, the applications of this material include spectacle lenses, cameras, lenses for various types of optical devices, and windowpanes.

What is claimed is:

1. An anti-fogging material comprising heat-molded glass having therein a mixture of:
    (1) 1–10% by weight niobium pentoxide;
    (2) 1–10% by weight of a magnesium compound selected from the group consisting of an oxide, hydroxide, fluoride, carbonate, phosphate, diphosphate and ammonium magnesium phosphate;
    (3) 1–10% by weight barium fluoride; and
    (4) 5–30% by weight lead.

* * * * *